UNITED STATES PATENT OFFICE.

JAMES MILLAR NEIL, OF TORONTO, ONTARIO, CANADA, ASSIGNOR TO ALEXANDER M. HAY, OF TORONTO, CANADA.

CONSTRUCTION MATERIAL.

1,023,673.  Specification of Letters Patent.  Patented Apr. 16, 1912.

No Drawing.  Application filed May 27, 1911. Serial No. 629,813.

*To all whom it may concern:*

Be it known that I, JAMES M. NEIL, of Toronto, in the county of York and Province of Ontario, Canada, have invented certain new and useful Improvements in Construction Materials; and I hereby declare that the following is a full, clear, and exact description thereof.

This invention is an improvement in the art of manufacturing compounds used for building material for surfacing roads, and other purposes in the arts; and its object is to produce novel binding materials for use in such compounds or manufactures; and also to provide a novel combination of materials which may be used in such arts.

A particular object of the invention is to provide soluble mixtures in a dry form, so that they can be readily transported to the place where they are to be used, which results in great economy of operation and facilitates their use in such manufactures.

Heretofore in the manufacture of artificial bricks, stone, concrete and other construction material, a solution of silicate of soda has been used, and I am aware that solutions of silicate of soda and sucrate of lime have also been used in connection with material for road construction. Such solutions being necessarily used in a liquid condition have been expensive to transport and are awkward to handle, under the conditions in which they must be used. Commercial silicate of soda is a thick syrupy mass which, when evaporated to dryness, is practically insoluble in cold water, and therefore not available in dry form for the purposes hereinafter mentioned. Sucrate of lime when evaporated to dryness, becomes an insoluble compound of tri-saccharate of lime.

I have discovered that by mixing an alkali (such as soda ash) with silicate of soda in its thick syrupy condition as sold in commerce and then evaporating such mixture a dry soluble compound is produced. For example the addition of about ten (10) parts of soda ash to ninety (90) parts of silicate of soda will produce the desired dry soluble powder. I have also discovered that by mixing tri-saccharate of lime with an acid salt (such as bi-carbonate of soda or niter cake) a dry soluble compound is produced. For example adding about equal parts of tri-saccharate of lime, and the acid salt will produce the desired dry soluble powder. Niter cake is a waste product obtained in the manufacture of nitric acid.

By mixing an acid salt for example bi-carbonate of soda with the insoluble tri-saccharate of lime, and upon the addition of water, one molecule of the carbonic acid in the acid salt combines with one molecule of the calcium in the tri-saccharate of lime, thereby producing a soluble saccharate of lime which then combines with the silicate of soda producing a silicate of lime.

In the manufacture of construction material and the like I use a mixture of the two dry soluble compounds above described,—preferably using, for example, about five parts of the dry soluble silicate compound to one part of the dry soluble tri-saccharate of lime compound. Lime or limestone (calcium carbonate) may be added to the said mixture in about the proportion of one of the mixture to two or more of lime or calcium carbonate. I do not consider it desirable to use more than fifteen parts of lime, or carbonate of lime, to one part of the mixture, because it would become so weak that the reactions would be too much retarded for practical working. The mixture is then ready for use, and can be transported in a dry state to the point where it is to be used, and there intermixed with the desired proportions of sand, gravel, rock, or other material which it is desired to bind. When the resultant mass is to be used, water must be added thereto; on the addition of water to the mass certain chemical reactions take place resulting in the production of silicate of lime and the final binding of all the materials into a compact mass of great strength and durability.

Instead of adding lime or limestone to the mixture at the point of manufacture, crushed limestone (carbonate of lime) may be added at the point of use; thereby reducing transportation charges.

The reactions which take place are about as follows: The free acid in the acid salt combines with part of the lime in the tri-saccharate producing a soluble saccharate of lime which, combining with the silicate of soda (which has been rendered soluble by the alkali,) forms the binding material, silicate of lime; simultaneously producing saccharate of soda. The latter reacting on the hydrate of lime (or carbonate of lime as the case may be) forms saccharate of lime and hydrate of soda (or carbonate of soda). The soda then re-acts on the silica contained in the material to be bonded, thereby forming silicate of soda; which re-acts with the saccharate of lime, again forming silicate of lime and saccharate of soda; thus recommencing the same cycle of re-actions above described. After the initial binding has taken place the re-actions are almost dormant, but are stimulated by pressure and climatic influences and will continue indefinitely so long as there is any free silica present in the mass of material which is being bound together by the silicate of lime.

What I claim is:

1. A binding material, comprising a mixture of a dry soluble compound obtained by treating silicate of soda with an alkali and evaporating to dryness; and a dry soluble mixture of tri-saccharate of lime and an acid salt, substantially as set forth.

2. A composition for building and construction purposes, comprising a filler; a dry soluble compound obtained by treating silicate of soda with an alkali and evaporating it to dryness; and a dry soluble mixture of tri-saccharate of lime and an acid salt, substantially as set forth.

3. A binding material, comprising a mixture of a dry soluble compound obtained by treating silicate of soda with an alkali and evaporating to dryness; and a mixture of tri-saccharate of lime and bi-carbonate of soda, substantially as set forth.

4. A material comprising a mixture of a filler, a dry soluble compound obtained by treating silicate of soda with an alkali and evaporating to dryness; and a dry soluble mixture of tri-saccharate of lime and bi-carbonate of soda, substantially as set forth.

In testimony that I claim the foregoing as my own, I affix my signature in presence of two witnesses.

JAMES MILLAR NEIL.

Witnesses:
ARTHUR E. DONELL,
JAMES R. MANSFIELD.

Copies of this patent may be obtained for five cents each, by addressing the "Commissioner of Patents, Washington, D. C."